United States Patent Office 3,340,723
Patented Sept. 12, 1967

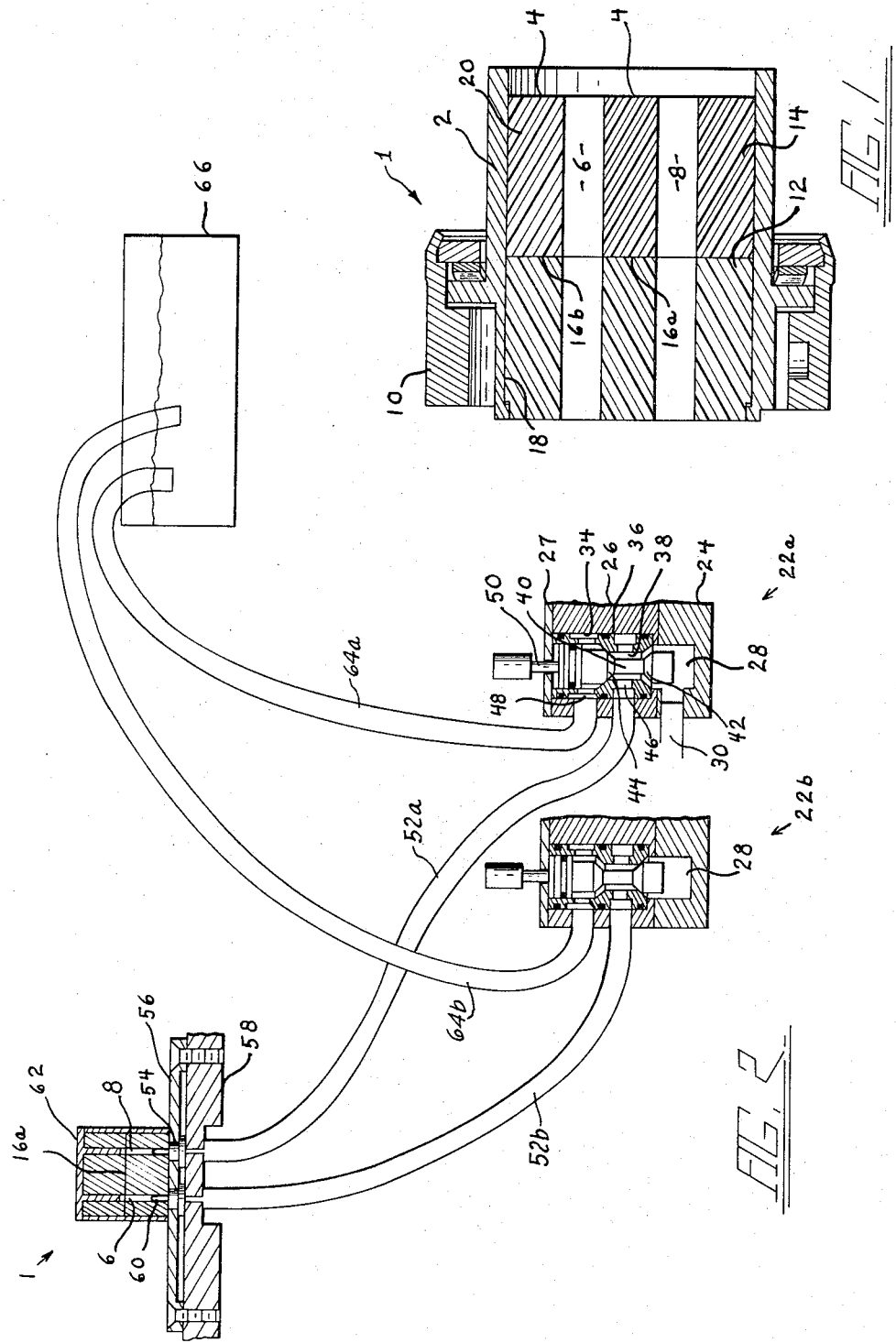

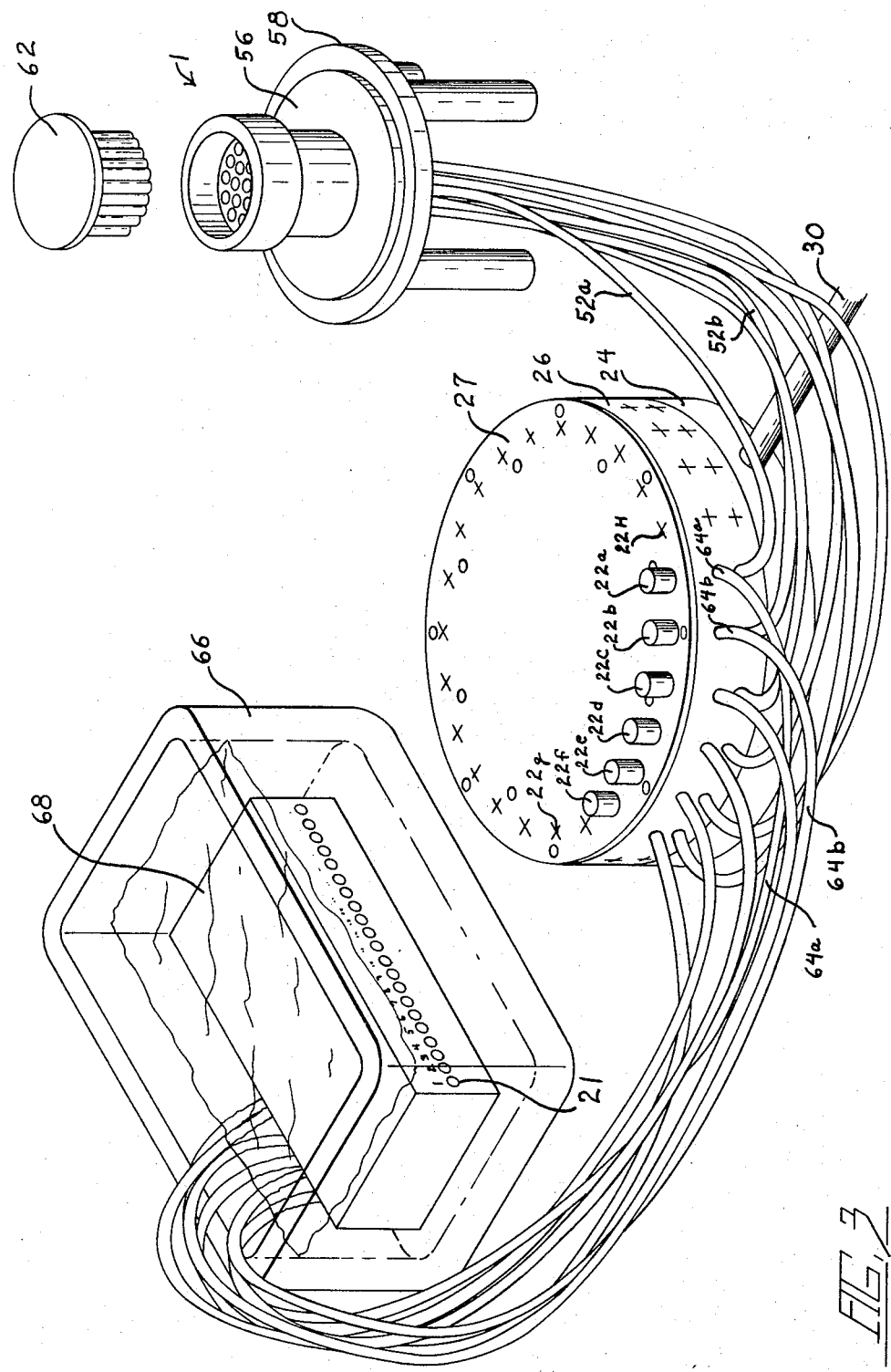

3,340,723
TESTING FOR LEAKAGE IN ELECTRICAL CONNECTORS
James William Harris, Mechanicsburg, and Clarence Leonard Paullus, Camp Hill, Pa., assignors to AMP Incorporated, Harrisburg, Pa.
Filed Oct. 11, 1965, Ser. No. 494,665
5 Claims. (Cl. 73—40)

ABSTRACT OF THE DISCLOSURE

Testing apparatus for electrical connectors having a plurality of cavities comprises means for selectively and individually pressurizing the cavities and simultaneously measuring the flow of pressurized fluid in the remaining cavities, thereby to detect leaks between adjacent cavities.

This invention relates to apparatus for the non-destructive testing of the adhesive joints and/or seals in an electrical connector.

One common type of multi-contact electrical connector assembly comprises two matable connector parts each of which consists of an outer shell member and an insert or housing in the shell through which a plurality of cavities or openings extend. Contact terminals, for example of the pin and socket type, are contained in the cavities so that when the two parts of the connector are coupled to each other, the contact terminals in the two parts are electrically engaged with each other to complete electrical connections between the wires to which the terminals are attached. For various reasons, the inserts are quite often made in two or more parts with the interfaces between the parts extending transversely of the connector axis. In high-quality connectors, these interfaces are sealed as by bonding and the entire insert assembly is bonded to the internal surface of the shell. The bonding of these interfaces has the effect of preventing the passage of moisture between the numerous cavities of the connector and increases the maximum operating voltage of the contacts in the connector. The present invention is directed to an apparatus for the non-destructive testing of these bonds in a connector insert.

It is an object of the invention to provide an improved apparatus for the non-destructive testing of electrical connectors. A further object is to provide an apparatus capable of determining the location of any leaks or inferior bonds in a connector insert.

These and other objects of the invention are achieved in a preferred embodiment which incorporates means for pressurizing each of the cavities of the connector insert one at a time and for detecting any flow of air in the other cavities. When an individual cavity is pressurized, any leaks present will be detected by a flow of air in one of the other cavities. If no such leaks exist, no airflow will be detected.

In the drawing:

FIGURE 1 is a sectional side view of a simplified form of an electrical connector;

FIGURE 2 is a schematic representation of a simplified apparatus in accordance with the invention; and FIGURE 3 is a perspective view of a preferred form of apparatus for testing the pressure-tight integrity of each cavity of a multi-contact electrical connector.

Referring first to FIGURE 1, a simplified form of multi-contact electrical connector 1 may comprise a cylindrical shell 2, a housing 4 of insulating material within the shell, and a coupling ring 10 rotatably mounted on the shell to couple the connector part 1 to a mating connector part (not shown). The housing 4 has a plurality of cavities 6, 8 extending therethrough for the reception of contact terminals such as pin or socket contacts. The housing 4 is commonly referred to in the connector art as an insert and will be so identified here. It will be understood that in practice the insert may have a large number of cavities and that only two cavities are shown in FIGURES 1 and 3 in the interest of simplicity. The insert 4 in FIGURE 1 is composed of two parts 12, 14 which are bonded to each other at a common interface indicated at 16a, 16b. There are several specific reasons for making the insert of two or more parts but the underlying reason is usually a requirement that some parts of the insert be of a firm non-yielding plastic material while other parts must be of a soft deformable material. For example, application Ser. No. 439,817, filed Mar. 15, 1965, discloses a connector in which one part of the connector has an insert composed of seven cylindrical sections and the other connector part has an insert composed of six cylindrical sections. The sound engineering reasons for these multi-section inserts are explained in detail in application Ser. No. 439,817, and are related, for the most part, to the retention system for retaining the contact terminals in the insert cavities. For purposes of the instant disclosure, it is sufficient to say that many commercially known connectors have such multi-section inserts.

In a high-quality electrical connector, the interface 16a, 16b is sealed so that no leaks or passageways exist between the cavities 6 and 8. Such sealing is usually achieved by bonding the interface with a suitable adhesive. The sealing of the interface is desirable in order to achieve the highest possible voltage flashover values and to prevent the passage of moisture or gas from one cavity to another. Additionally, the periphery of the insert 4 is quite often bonded at 18 and 20 to the internal surface of the shell and again, a high-quality bond is required for the better grades of connectors. U.S. Government specifications (NAS 1599 and Mil–C–26–500) recognize the importance of these seals in that they specify that all air paths between contacts must be eliminated. The present invention is thus directed to the problem of determining the quality of the bonds between the parts of the connector inserts.

In the schematic representation of one form of apparatus in accordance with the invention (FIGURE 2) there are provided two valve assemblies 22a, 22b which are identical to each other so that a description of one will suffice for both. Each valve assembly comprises a base member 24, a body section 26, and a cap piece 27. As will be explained below, the base, body and cap are common to all of the valve assemblies in the apparatus of FIGURE 3 although they are shown separately in FIGURE 2 in the interest of clarity. The base 24 has a chamber 28 which is pressurized with compressed air by means of an inlet 30 extending from a suitable compressor or other source of compressed air. The body portion 26 of the valve assembly is provided with a cylindrical opening 34 which communicates with the chamber 28 and in which a conventional valve body 36 is mounted. This valve body has a central constricted portion 38 with chambers above and below this constricted portion. A conventional valve spool 40 contained in the body has a neck portion of reduced diameter extending through the central constricted portion of the valve body and has enlarged ends in the chambers at each end of the central neck portion. The lower conical surface 42 of the valve spool is adapted to seat against a conical surface in the lower end of the valve body and a similar upper conical surface 44 is adapted to seat against a conical surface in the upper chamber. A rod 50 extends upwardly from the valve spool through a suitable opening in the cap piece 27 and has an enlarged upper end as indicated. Since the chamber 28 is normally pressurized, the valve spools are normally biased to the position of the spool in the valve assembly 22b. The valve spools can be shifted to the position of the valve assembly 22a by merely pressing on the upper end of the rod 50.

The valve body 36 has an outlet port 46 in its central constricted section which is coupled to an air line 52 and a second outlet port 48 communicating with its upper chamber which is coupled to an air line 64. In the drawing, the air lines 52, 64 of the two valve assemblies 22a, 22b are specifically denoted by the letters a or b to relate them to the valve assembly from which they extend. The air line 52 of each valve 22 extends to a fitting 54 which is clamped, by means of an intermediate collar, between a pair of plates 56, 58. These plates comprise a mounting fixture for the connector part 1 being tested. Each fitting 56 thus has an upwardly projecting tube portion 60 which is adapted to enter a cavity of the connector. The air lines 64 have their ends submerged in a container of water 66 to indicate the passage of air in the event of leaks as will be explained immediately below.

In use, the connector part 1 is mounted on the fixture 58, 56 with the end portions 60 of the fittings 54 extending into the cavities of the connector. The open upper ends of the cavities are plugged by a suitable plug member 62 and one of the rods 50 is depressed to pressurize the cavity being tested. When the rod 50 of the valve 22a is depressed, compressed air will flow past the surface 42, through the port 46, and through the air line 52a to the cavity 8. The compressed air cannot, of course, flow past the surface 44 of the valve assembly 22a since this surface is seated against the upper valve seat. If the interface between the two parts of the insert should be defective at 16a, compressed air will flow through the leak from the cavity 8 to the cavity 6 and will then flow through the line 52b to the valve assembly 22b. Since the valve spool of this valve is in its normal position, the air will flow through the line 64b to the submerged outlet of this air line and bubbles will be observed in the container 66. If no leaks are present, no bubbles will be observed.

In order to test for leakage between any one of the cavities and the outside of the shell (for example, a leak at 16b and 18 or 20), the entire connector and fixture are submerged in water and the control rods 50 are depressed. If such leaks exist, they would produce a stream of bubbles. It will thus be apparent that the test is completely effective but at the same time non-destructive so that every connector produced can be tested for its pressure-tight integrity and any defective connector will be readily revealed.

FIGURE 3 shows a specific embodiment of the invention intended to test a multi-contact connector having twenty-one contact-receiving cavities extending therethrough. It will be noted that the individual valve assemblies 22a, 22b, 22c . . . 22h are all mounted in a single manifold comprising the previously identified base 24, body 26, and cap piece 27. The chamber 28 comprises a circular channel in the base 24 which communicates with the air inlet 30 as indicated. The effectiveness of the individual seals surrounding each individual cavity in the connector can thus be determined by pressing the rods 50 extending from the valve assemblies 22a, 22b . . . 22h one after the other. The air lines 64a, 64b, etc., extend to a block 68 in the container 66 which has a number of passageways extending therethrough equal to the number of cavities in the connector insert.

It will be noted that the outlets 21 for the air lines 64a, 64b, etc. in the block 68 are identified with numbers located above each outlet. These numbers correspond to the position numbers of the cavities in the connector insert. It should be explained that it is conventional in the electrical connector art to identify specific cavities in a multi-contact connector insert by position numbers, for example, the cavities are numbered beginning with the center cavity and progressing along a spiral path to the outer cavities of the insert. By virtue of this arrangement, each one of the valve assemblies 22a, 22b, etc. will be associated with a specific cavity in the connector and the outlets 21 in the block 68 will, likewise, be associated with a specific cavity. Thus, if cavity 1 is being tested (i.e., is being pressurized) and bubbles are observed at the outlet in block 68 associated with cavity 2, it will be apparent that a leak exists between cavities 1 and 2. It is thus not only possible to determine the presence of interfacial leaks but also it is possible to determine the precise location of such leaks.

As previously noted, the peripheral seals (18, 20 of FIGURE 1) can also be tested merely immersing the entire connector and supporting fixture 58, 60 in water. To test the peripheral seals, the valve rods 50 may, if desired, all be depressed simultaneously thereby to pressurize all of the cavities in the connector simultaneously. If leaks exist in the peripheral seals, air bubbles will be observed in the vicinity of the connector when it is submerged.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. Apparatus for testing the pressure-tight integrity of an electrical connector housing having a plurality of cavities extending therethrough, said connector housing comprising at least two parts with an interface between said parts extending normally of the axes of said cavities, said apparatus comprising, means for plugging all of said cavities at one end, a plurality of compressed air lines corresponding to the number of said cavities, means for coupling each of said air lines with one of said cavities, a source of compressed air, a plurality of air-flow detecting devices equal in number to the number of said cavities, and each of said compressed air lines having valve means therein for selectively coupling said air lines to said compressed air source or to one of said air-flow indicating devices whereby, upon coupling one of said air lines to said source when the remaining ones of said lines are connected to their indicating devices, any leakage between said one cavity and any other cavity will be revealed by a flow of air in the air line connected to said other cavity.

2. Apparatus for testing the pressure-tight integrity of an electrical connector, said connector comprising a housing having a plurality of cavities extending therethrough for reception of contact terminals, said housing being formed of at least two parts and having an interface between said parts, said interface extending transversely of the axes of, and intersecting, said cavities, said apparatus comprising, a plurality of compressed air lines equal to the number of said cavities, means for coupling each of said air lines to one of said cavities, means for plugging the remaining open ends of said cavities, a source of compressed air, a plurality of submerged air outlets equal to the number of said cavities and compressed air lines, each of said outlets being associated with one of said air lines, and valve means in each of said air lines for selectively coupling each air line with either said compressed air source or its associated outlet whereby, upon pressurizing any one of said air lines when the remaining air lines are coupled to their respective outlets, any leakage between said one cavity and any other cavity will be revealed by the appearance of air bubbles at the associated air outlet.

3. A device as set forth in claim 2 wherein each of said air lines extends to a specifically identified one of said cavities, and including means for identifying each of said submerged outlets whereby each outlet is associated with a specifically identified cavity.

4. Apparatus for testing the pressure-tight integrity of an electrical connector having a plurality of cavities extending therethrough, said apparatus comprising,
   a source of compressed fluid,
   first coupling means for selectively coupling said source of compressed fluid to each of said cavities individually,
   means for preventing unrestricted escape of compressed fluid from the one cavity coupled by said first coupling means to said source of compressed fluid whereby, said one cavity is pressurized,
   fluid flow detecting means, and
   second coupling means for coupling the remaining ones of said cavities to said fluid flow detecting means whereby,
a leakage between the pressurized one of said cavities and the remaining cavities is detected by said fluid flow detecting means.

5. Apparatus as set forth in claim 4 wherein said fluid flow detecting means comprises a plurality of submerged outlets, each of said outlets being coupled by said second coupling means to one of the remaining ones of said cavities.

References Cited
UNITED STATES PATENTS

| | | | |
|---|---|---|---|
| 1,592,389 | 7/1926 | Spill | 73—48 |
| 2,761,311 | 9/1956 | Baker | 73—46 |
| 2,806,371 | 9/1957 | Stecker | 73—49.2 |
| 2,880,610 | 4/1959 | McCoy | 73—49.2 |

FOREIGN PATENTS

| | | |
|---|---|---|
| 625,592 | 6/1949 | Great Britain. |

LOUIS R. PRINCE, *Primary Examiner.*

J. NOLTON, *Assistant Examiner.*